(12) United States Patent
Nakamoto

(10) Patent No.: US 10,696,254 B2
(45) Date of Patent: Jun. 30, 2020

(54) VEHICLE FRONT BODY STRUCTURE HAVING BRACKET COUPLING STRUCTURE

(71) Applicant: TOYOTA JIDOSHA KABUSHIKI KAISHA, Toyota-shi, Aichi-ken (JP)

(72) Inventor: Tomoo Nakamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/160,649

(22) Filed: Oct. 15, 2018

(65) Prior Publication Data

US 2019/0143920 A1 May 16, 2019

(30) Foreign Application Priority Data

Nov. 10, 2017 (JP) ................. 2017-217553

(51) Int. Cl.
| | |
|---|---|
| *B62D 25/08* | (2006.01) |
| *B60R 19/24* | (2006.01) |
| *B60R 19/34* | (2006.01) |
| *B60K 11/04* | (2006.01) |
| *E05B 83/24* | (2014.01) |

(52) U.S. Cl.
CPC .............. *B60R 19/24* (2013.01); *B60K 11/04* (2013.01); *B60R 19/34* (2013.01); *B62D 25/084* (2013.01); *E05B 83/24* (2013.01)

(58) Field of Classification Search
CPC .... B62D 25/084; B62D 25/085; B62D 25/10; B62D 25/12; E05B 83/24; B60R 19/24; B60R 19/34; B60R 19/52; B60R 2019/525; B60K 11/04
See application file for complete search history.

(56) References Cited

U.S. PATENT DOCUMENTS

| | | | | |
|---|---|---|---|---|
| 4,428,447 A | * | 1/1984 | Malen ................. | B62D 25/084 165/53 |
| 6,227,321 B1 | | 5/2001 | Frascaroli et al. | |
| 7,497,289 B2 | * | 3/2009 | Kwun ................. | B62D 25/084 180/68.4 |
| 2010/0163324 A1 | * | 7/2010 | Jyoutaki ............... | B60K 11/04 180/68.1 |
| 2014/0062141 A1 | * | 3/2014 | Townson ................ | G01B 5/24 296/193.11 |
| 2015/0274211 A1 | * | 10/2015 | Riedl .................. | B62D 25/084 296/187.09 |

(Continued)

FOREIGN PATENT DOCUMENTS

| | | |
|---|---|---|
| JP | 2002-096760 A | 4/2002 |
| JP | 2007-216706 A | 8/2007 |

*Primary Examiner* — Gregory A Blankenship
(74) *Attorney, Agent, or Firm* — Oliff PLC (57) ABSTRACT

A bracket coupling structure includes a pair of brackets each coupling an upper part of a radiator support with a bumper R/F, and a hood lock coupled with the pair of brackets. The radiator support upper part is disposed in an upper portion of a front body structure and extends in a vehicle width direction for supporting an upper portion of a radiator body. The bumper R/F is disposed in a front portion of the front body structure and extends in the vehicle width direction. This structure provides a bracket structure which disperses a load generated when a force in the vertical compression direction acts on the hood lock in the front body structure.

6 Claims, 6 Drawing Sheets

(56) References Cited

U.S. PATENT DOCUMENTS

| | | | |
|---|---|---|---|
| 2015/0343973 A1* | 12/2015 | Stoenescu | B60R 19/03 |
| | | | 293/133 |
| 2016/0244014 A1* | 8/2016 | Ihori | B62D 25/084 |
| 2018/0134242 A1* | 5/2018 | Humpenoeder | B60R 19/18 |
| 2018/0178845 A1* | 6/2018 | Hayashi | B62D 25/084 |
| 2019/0092393 A1* | 3/2019 | Yamatani | B60R 19/34 |
| 2019/0143920 A1* | 5/2019 | Nakamoto | B60R 19/24 |
| | | | 296/193.09 |

* cited by examiner

VEHICLE FRONT BODY STRUCTURE HAVING BRACKET COUPLING STRUCTURE

CROSS REFERENCE TO RELATED APPLICATION

The entire disclosure of Japanese Patent Application No. 2017-217553 filed on Nov. 10, 2017, including the specification, claims, drawings, and abstract is incorporated herein by reference in its entirety.

TECHNICAL FIELD

The present disclosure relates to a bracket coupling structure for coupling a radiator support and a bumper reinforcement in a front body structure of a vehicle.

BACKGROUND

In a known technique, a hood lock device to be engaged with a striker mounted on a front hood is connected, directly or via a coupling member, with a radiator support in a front body structure of a vehicle. In this structure, a load to be applied to the hood lock device generated by closing the hood is conveyed to the entire radiator support.

JP 2007-216706 A describes a front body structure of a vehicle, including a bumper reinforcement extending in the right-left direction of the vehicle. The bumper reinforcement includes a first bumper reinforcement located on the upper side and a second bumper reinforcement located on the lower side. In the front body structure, the first bumper reinforcement is coupled with a hood lock member disposed in the vehicle width direction via brackets.

SUMMARY

Technical Problem

The brackets described in JP 2007-216706 A are configured to convey an impact from the front hood, which is transferred from a hood latch, to the hood lock support member (first bumper reinforcement). However, as this structure allows concentration of load when a force in the vertical compression direction acts on the hood lock, great stress may be applied to the bracket fasteners, the hood lock member to which the brackets are fixed, and the hood lock support member.

An embodiment of the present disclosure is directed toward a bracket structure in the front body structure, that can disperse the load when a force in the vertical compression direction is applied to the hood lock.

Solution to Problem

In accordance with an aspect of the disclosure, a bracket coupling structure includes a pair of brackets each coupling a radiator support upper part with a bumper reinforcement, and a hood lock coupled with the pair of brackets. The radiator support upper part is disposed in an upper portion of a front body structure and extends in a vehicle width direction for supporting an upper portion of a radiator body. The bumper reinforcement is disposed in a front portion of the front body structure and extends in the vehicle width direction.

In the present disclosure, the pair of brackets may be disposed symmetrically with respect to the center of the vehicle in the width direction. In the present disclosure, each bracket may have a crank shape. The radiator support upper part may be made of resin and both the bumper reinforcement and the pair of brackets may be made of metal. The first interval between the first coupling positions where the pair of brackets are respectively coupled with the radiator support upper part may be shorter than the second interval between the second coupling positions where the pair of brackets are respectively coupled with the bumper reinforcement.

Advantageous Effects of Invention

The bracket coupling structure includes a pair of brackets each coupling a radiator support upper part that supports the upper portion of a radiator body with a bumper reinforcement, and a hood lock coupled with the pair of brackets. When a force in the vertical compression direction is applied to the hood lock, this structure disperses the load acting on the hood lock to the radiator support upper part and the bumper reinforcement. This structure further allows the pair of brackets to disperse the load applied to the bumper reinforcement rightward and leftward in the vehicle width direction. This reduces the stress applied to bracket fasteners, a hood lock member to which the brackets are fixed, and a hood lock support member.

BRIEF DESCRIPTION OF DRAWINGS

Embodiments of the present disclosure will be described based on the following figures, wherein.

DESCRIPTION OF EMBODIMENTS

Embodiments of the present disclosure will be described with reference to the drawings.

Figure 1:
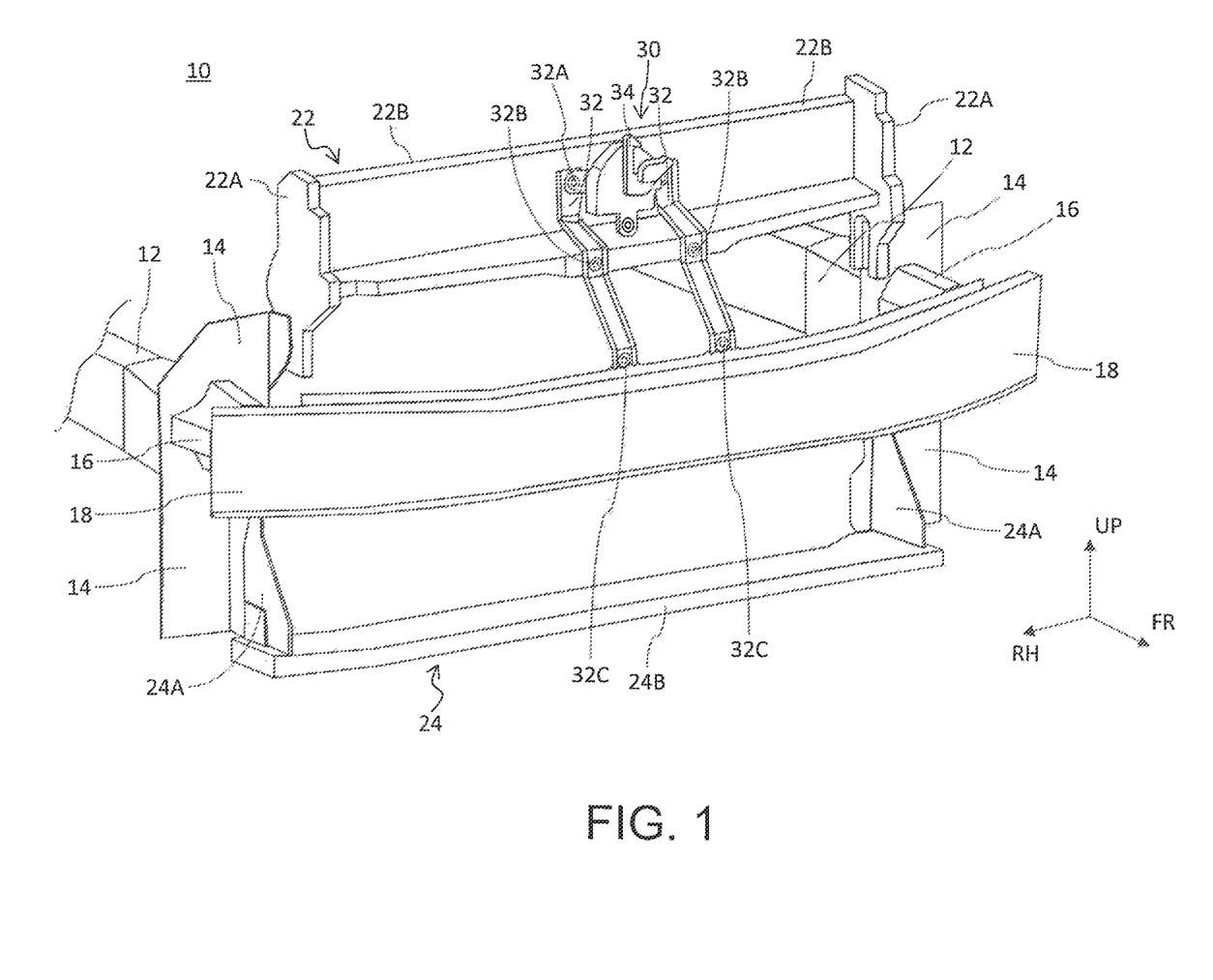
FIG. 1 is a perspective view illustrating a structure of a front body structure including a bracket coupling structure according to an example embodiment.
Figure 2:
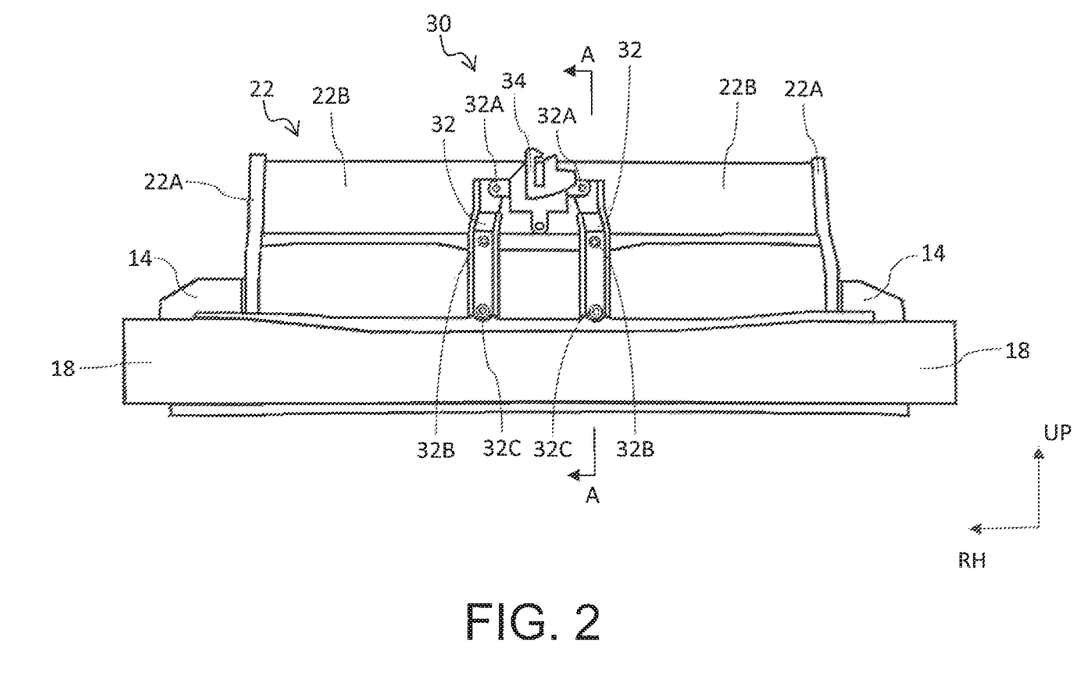
FIG. 2 is a front view schematically illustrating the bracket coupling structure according to the example embodiment, and the surrounding structure.
Figure 3:
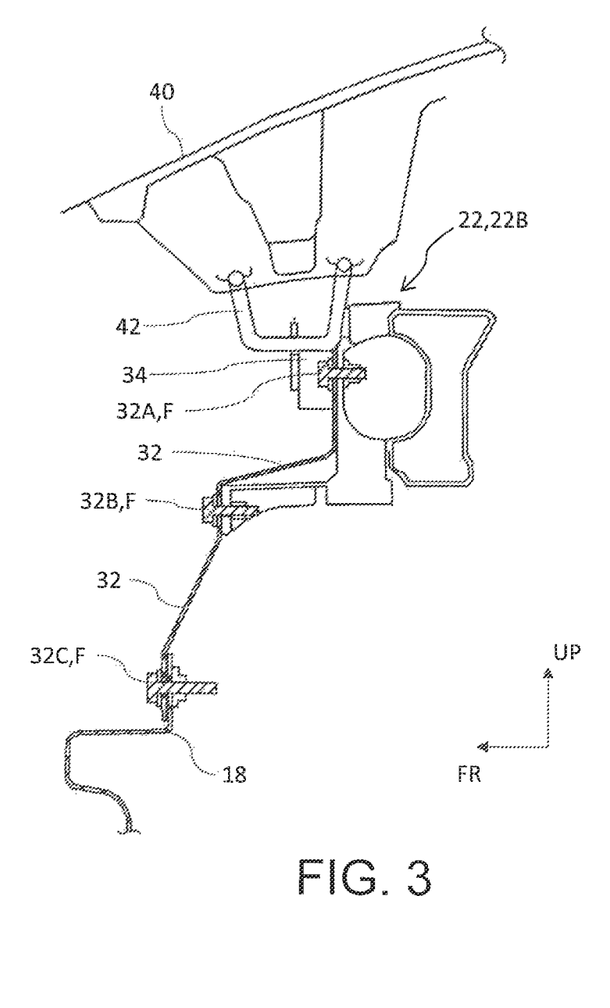
FIG. 3 is a cross sectional view schematically illustrating the bracket coupling structure according to the example embodiment, and the surrounding structure.

FIG. 1 is a perspective view illustrating the configuration of a front body structure of a vehicle including a bracket coupling structure according to an embodiment of the disclosure. FIG. 2 is a front view illustrating the bracket coupling structure according to the present embodiment, and the surrounding structure. FIG. 3 is a partial cross sectional view taken along line A-A in FIG. 2, and illustrates the bracket coupling structure according to the present embodiment, and the surrounding structure. In each drawing, the direction indicated by arrow RH corresponds to the rightward direction of the vehicle, the direction indicated by arrow UP corresponds to the upward direction of the vehicle, and the direction indicated by arrow FR corresponds to the forward direction of the vehicle. In the following description, terms expressing orientations and directions, such as front (forward), back (backward), right (rightward), left (leftward), above (upward), and below (downward), for example, refer to orientations and directions with respect to a vehicle, unless otherwise specified.

As illustrated in FIG. 1 to FIG. 3, a front body structure 10 of a vehicle includes, toward respective ends, front side members 12 extending along the forward-backward direction. The front side member 12 is composed of a vehicle frame member having a cross section of substantially a rectangle shape along substantially the vehicle width direction and the vehicle upward-downward direction. The front body structure 10 further includes crush boxes 16 serving as impact-absorbing members, in front of front ends of the respective front side members 12 via corresponding reinforcing plates 14. The crush box 16 includes a tubular member disposed in substantially the vehicle forward-backward direction, and is configured to be axially deformed by compression upon receiving a collision load, to thereby absorb the collision energy.

The front body structure 10 includes, at the front thereof and on the front ends of the crush boxes 16, a bumper reinforcement (hereinafter referred to as a "bumper R/F") 18 extending in the vehicle width direction. The bumper R/F 18, which is composed of a metallic bumper frame member, extends between the pair of right and left crush boxes 16. The bumper R/F 18 is curved to have a center portion in the vehicle width direction protruding further forward of the vehicle than both of its ends in the vehicle width direction.

The front body structure 10 of the vehicle further includes a radiator support that supports a radiator body (not shown). The radiator support includes a radiator support upper part (hereinafter referred to as an "upper part") 22 for supporting an upper portion of the radiator body, and a radiator support lower part (hereinafter referred to as a "lower part") 24 for supporting a lower portion of the radiator body. As illustrated in FIG. 1, the upper part 22 and the lower part 24 are disposed separately (individually) and are not directly coupled with each other.

The upper part 22 of the radiator support includes a pair of right and left side walls 22A and an upper part body 22B disposed between upper portions of these side walls 22A substantially along the vehicle width direction. The side walls 22A are respectively fixed to reinforcing plates 14 joined to front ends of the front side members 12 at both ends in the vehicle width direction. In the present embodiment, the upper part 22 of the radiator support is formed of a resin member, and the pair of left and right side walls 22A and the upper part body 22B are integrally formed. The side walls 22A are fixed to the reinforcing plates 14 by means of fasteners including a bolt and a nut. In FIGS. 1 and 2, however, the fasteners including a bolt and a nut are not shown. The shape of the side wall 22A and the shape of the upper part body 22B are not limited to the shapes in the present embodiment, and may be modified.

The lower part 24 of the radiator support includes a pair of right and left plate members 24A and lower part body 24B fixed to lower end portions of these plate members 24A and extending substantially along the vehicle width direction. The plate members 24A are respectively fixed to the reinforcing plates 14 joined to the front ends of the front side members 12 at both ends in the vehicle width direction. The plate member 24A has a right-angled triangle shape with a main surface facing the vehicle width direction and two sides thereof that together form a right angle being respectively located on the rear side and the lower side of the vehicle. The pair of right and left plate members 24A are formed on both ends symmetrically in the vehicle width direction. The lower part body 24B has a rectangular shape and is joined to the plate members 24A by means of fasteners formed of a bolt and a nut (not shown). In the present embodiment, the lower part 24 (the plate members 24A and the lower part body 24B) is formed of a metal plate such as a steel plate. The lower part 24 may include a bracket having a bending surface connecting the reinforcing plate 14 with the plate member 24A. The bending surface bracket may have an L-shaped horizontal cross section, with the vertical portion of the L shape being welded to the reinforcing plate 14 while the horizontal portion of the L shape is fastened to the plate member 24A using a bolt.

The bracket coupling structure 30 according to the present embodiment includes a pair of brackets 32 respectively coupling the upper part 22 (upper part body 22B) of the radiator support with the bumper R/F 18, and a hood lock 34 coupled with the pair of brackets 32.

As illustrated in FIG. 1 to FIG. 3, each of the pair of brackets 32 is fixed to the upper part 22 by means of a fastener F (see FIG. 3) including a bolt and a nut at two locations; a first fixing point 32A located at the upper end, and a second fixing point 32B that is a first coupling position located in the center portion. Each of the pair of brackets 32 is further fixed to the bumper R/F 18 by a fastener F (see FIG. 3) including a bolt and a nut at a third fixing point 32C that is a second coupling position located at the lower end. The fastener F in the third fixing point 32C may fasten the bracket 32 and the bumper R/F 18 together with the bolt being disposed backward and the nut being disposed forward as opposed to the arrangement of the fastener F illustrated in FIG. 3. In the present embodiment, the bracket 32 is composed of a metallic member such as a steel plate. The bracket 32 is further cranked between the first fixing point 32A and the second fixing point 32B, and is shaped to be bent forward toward the lower portion of the bracket 32 between the second fixing point 32B and the third fixing point 32C, as illustrated in FIG. 3.

As illustrated in FIG. 2, the pair of brackets 32 are disposed symmetrically with respect to the center of the vehicle in the width direction. In other words, with respect to a plane passing through the center of the vehicle in the width direction and extending in the upward-downward direction and the forward-backward direction, the first fixing points 32A of the pair of brackets 32 are disposed at an equal distance, the second fixing points 32B are disposed at an equal distance, and the third fixing points 32C are disposed at an equal distance. As further illustrated in FIG. 2, in the present embodiment, the pair of brackets 32 are disposed such that the distance (first interval) between the second fixing points 32B that are the first coupling positions and the distance (second interval) between the third fixing points 32C that are the second coupling positions are equal to each other. More specifically, the pair of brackets 32 are disposed parallel to each other between the second fixing point 32B and the third fixing point 32C. However, the pair of brackets 32 may be disposed such that the first interval is shorter than the second interval to have a truncated chevron shape in a front view, or such that the first interval is longer than the second interval to have a reversed truncated chevron shape in a front view, as will be described below.

As illustrated in FIG. 3, a front hood 40 is disposed to cover the region above the front body structure 10. The hood lock 34 of the bracket coupling structure 30 has a latch mechanism that releaseably locks a striker 42 of the front hood 40, and is disposed at the front upper end of the front body structure 10 to be coupled with the pair of brackets 32. The hood lock 34 is attached to the upper ends of the pair of brackets 32 and the upper part 22 by means of the fastener F including a bolt and a nut at the respective first fixing points 32A. Thus, at each fixing point 32A, the hood lock 34, the bracket 32, and the upper part 22 are fixed in sequence from the front of the vehicle by means of the single fastener F.

The operation and effect of the bracket coupling structure 30 according to the present embodiment will be described.

In the present embodiment, the hood lock 34 is coupled with the pair of brackets 32, each of which, in turn, is joined to the upper part 22 and the bumper R/F 18. When closing the front hood 40 causes a downward impact to be applied to the hood lock 34, which further causes a force in the upward-downward compression direction to act on the brackets 32 and the upper part 22, the structure of the present embodiment allows the load to be dispersed, via the brackets 32, to the upper part 22 and the bumper R/F 18. The load transferred to the bumper R/F 18 is further dispersed, via the reinforcing plates 14, to the front side members 12.

Another structure will be assumed in which, for example, a single coupling structure that couples the hood lock 34 with the bumper R/F 18 is provided at the center in the vehicle width direction. In this structure, in which the coupling structure and the bumper R/F 18 are coupled with each other only at one specific location, the load applied to the hood lock 34 is concentrated to this coupling position. This may increase the stress applied to the fastener F of brackets 32, the hood lock 34 to which the brackets 32 are fixed, and the hood lock support member (not shown). It is therefore necessary to enhance the strength of the coupling structure and the fastener at the coupling position against the strong downward impact to be applied to the hood lock 34 that is generated upon closing the front hood 40.

The bracket coupling structure 30 of the present embodiment, on the contrary, includes the two brackets 32, each coupling the hood lock 34, the bumper R/F 18, and the upper part 22 of the radiator support, on the right or left in the vehicle width direction. This structure disperses the load applied to the bumper R/F 18 from the hood lock 34 via the brackets 32, rightward and leftward in the vehicle width direction, instead of concentrating the load to only a single location. Consequently, if a strong downward impact is applied to the hood lock 34, the load applied to the brackets 32 and the fastener F at the third fixing point 32C can be reduced. The stress applied to the fasteners F of the brackets 32, the hood lock 34 to which the brackets 32 are fastened, and the hood lock support member can also be reduced.

As illustrated in FIG. 2, the bracket coupling structure 30 according to the present embodiment includes a pair of brackets 32 that are disposed symmetrically with respect to the center of the vehicle in the width direction. This structure evenly disperses, the load applied to the hood lock 34 generated by closing the front hood 40, or the tensile pull caused by the impact from forward of the vehicle, and the load applied to the upper part 22 generated by traveling over an obstacle, for example, which will be described below, rightward and leftward in the vehicle width direction.

A known example technique concerning a hood lock fixing structure includes a technique of coupling the hood lock device to a center part of the radiator support in the vehicle width direction. This technique causes the radiator support to receive the load applied to the hood lock device generated by closing the hood. This requires the strength of the radiator support to be maintained against the impact applied to the hood lock 34, by forming the whole radiator support with a metallic member such as a steel plate.

According to the present embodiment, on the contrary, the bracket coupling structure 30 includes a pair of brackets 32 for coupling the hood lock 34, the bumper R/F 18, and the upper part 22 of the radiator support together, thereby dispersing the load applied to the hood lock 34 to the bumper R/F 18 via the pair of brackets 32. This structure reduces the load applied to the radiator support, which further allows a part of the radiator support (e.g., the upper part 22 as in the present embodiment) to be made of resin rather than metal, thereby reducing the weight of the radiator support.

The conventional structure, in which the hood lock is fixed to the radiator support, further requires increased strength of the radiator support itself against the forward impact applied to the vehicle, in order to prevent a backward motion of the front hood which is locked by the hood lock. This structure therefore requires an increase in the strength involving an increased mass for the radiator support partially made of a resin member, such as an increase in the thickness of the structural member, an increase in the material strength, or insert molding of a steel member, for example.

The bracket coupling structure of the present embodiment, on the contrary, includes the brackets 32 for coupling the hood lock 34 with the bumper R/F 18. This structure allows the front hood 40 to be coupled, via the hood lock 34 and the brackets 32, with the strong bumper R/F 18, when a forward impact is applied to the vehicle. The structure, including the upper part 22 made of a resin for coupling with the hood lock 34 via the brackets 32, therefore has an enhanced durability against the forward impact applied to the vehicle.

In addition, the bracket 32 according to the present embodiment has a crank shape as illustrated in FIG. 3. Therefore, when a load in the tensile direction is applied to the bracket 32 to increase the distance between the hood lock 34 coupled with the upper end of the bracket 32 and the bumper R/F 18 coupled with the lower end of the bracket 32, the crank portion of the bracket 32 can be extended to appropriately secure the length corresponding to the increased length.

Figure 4:
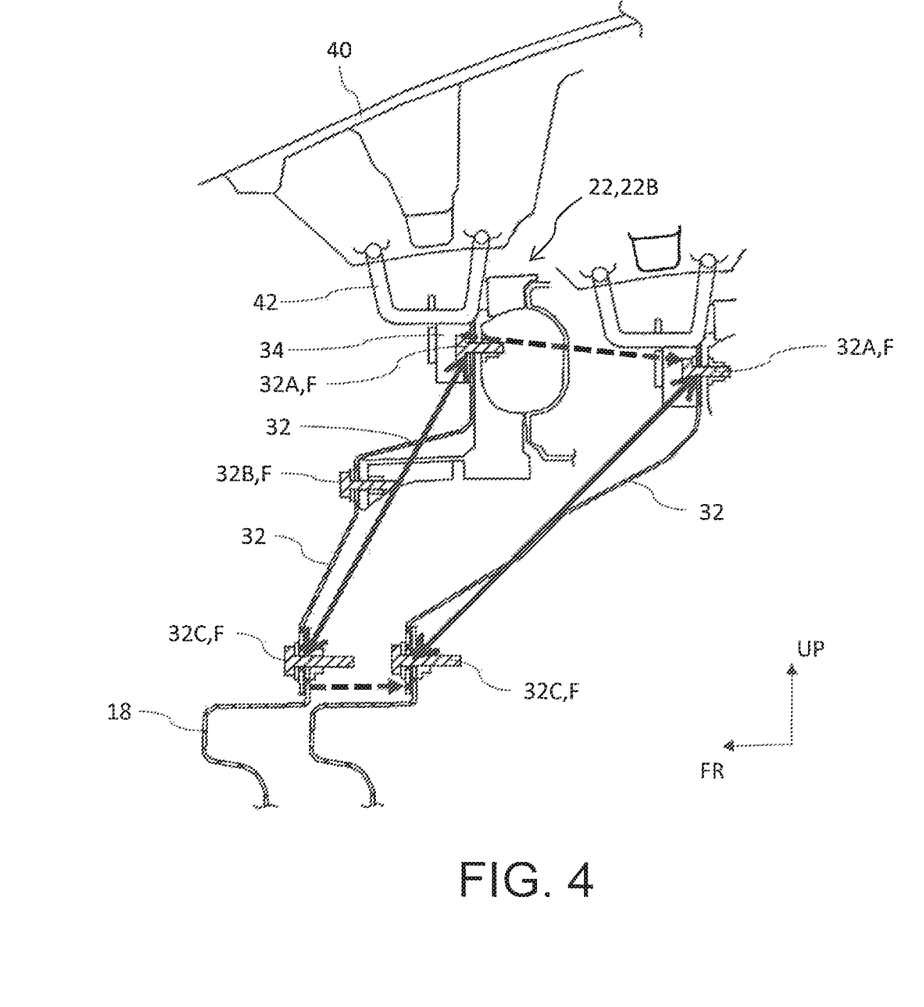
FIG. 4 is a diagram showing motion of the bracket coupling structure before and after application of an impact from the front portion of a vehicle.

Referring now to FIG. 4, the operational effect of the bracket coupling structure 30 when an impact from the front of the vehicle is applied thereto will be described.

FIG. 4 illustrates positions of the bracket coupling structure 30 before and after receiving the impact from the front of the vehicle. The front hood 40 is formed to be bent (deformed) at a brittle part located in the center portion in the forward-backward direction of the front hood 40, upon receiving the forward impact. Therefore, when the load from the front of the vehicle is applied with the striker 42 being engaged with the hood lock 34, the front hood 40 is deformed to cause the hood lock 34 that locks the striker 42 to move backward as illustrated by dashed line in FIG. 4.

When the bumper R/F 18 receives the forward load, the load is transmitted to the crush boxes 16 coupled with the right and left ends of the bumper R/F 18. The crush boxes 16 absorb the load and collapse. The bumper R/F 18 moves backward as indicated by a dashed line in FIG. 4 by an amount corresponding to the collapse of the crush boxes 16. As the front side members 12 with high rigidity are located behind the respective crush boxes 16, however, the distance of the backward movement of the bumper R/F 18 is smaller than the distance of the backward movement of the hood lock 34. This increases the distance between the first fixing point 32A on the upper end of the bracket 32 to which the hood lock 34 is fixed and the third fixing point 32C on the lower end of the bracket 32 to which the bumper R/F 18 is fixed.

It is now assumed that the hood lock 34 and the bumper R/F 18 are coupled with each other by a planar coupling member which connects these members with the minimum distance between them before the impact from the front of the vehicle is applied. However, such a planar coupling member may have difficulty in maintaining connection between the hood lock 34 and the bumper R/F 18 against the tensile pull generated by the forward impact.

The bracket coupling structure 30, on the other hand, includes the bracket 32 having a crank shape as illustrated in FIGS. 3 and 4. When the impact from the front of the vehicle is applied to cause the tensile pull to act between the first fixing point 32A to which the hood lock 34 is fixed and the third fixing point 32C to which the bumper R/F 18 is fixed, this crank portion extends to absorb the increased distance between the first and third fixing points, thereby maintaining the coupling structure between the hood lock 34 and the bumper R/F 18.

Further, the bracket 32 of the present embodiment, which is made of a metallic member, has an increased strength and transmits the load efficiently. The bracket 32 further disperses the load from the hood lock 34 to the bumper R/F 18 appropriately when the upper part 22 is made of a resin member.

The bracket coupling structure 30 of the present embodiment, including the pair of brackets 32 for coupling the upper part 22 of the radiator support and the bumper R/F 18, increases rigidity of the upper part 22. For example, when the vehicle rides over an obstacle and an impact is applied from the obstacle to the lower part 24, this impact, in turn, causes an upward load to act on the upper part 22 via the radiator body. The pair of brackets 32 can efficiently disperse such a load acting on the upper part 22 to the bumper R/F 18. In the present embodiment, in which the upper part 22 and the brackets 32 are coupled at the two fixing points, namely the first fixing point 32A and the second fixing point 32B, the load acting on the upper part 22 can be reliably transmitted to the bumper R/F 18.

The structure described above is an example and may be modified as appropriate if the structure includes a pair of brackets 32 for coupling the upper part 22 of the radiator support and the bumper R/F 18, and the hood lock 34 coupled with the pair of brackets 32. While in the above description the upper part 22 and the lower part 24 of the radiator support are not directly coupled with each other, the radiator support may have a rectangular frame shape including a pair of right and left side parts respectively disposed on the right and left sides of the radiator body and extending in the upward-downward direction, with the respective upper ends joined with the upper part and the respective lower ends joined with the lower part. Further, while in the above description the upper part 22 is formed of a resin member, the upper part 22 coupled with the bracket 32 (the upper part body 22B) may be formed of a metallic member such as steel plate. Also, while in the above description a fastener including a bolt and a nut is used to fasten the members together, other known means such as welding may be used to fasten the members.

Figure 5:
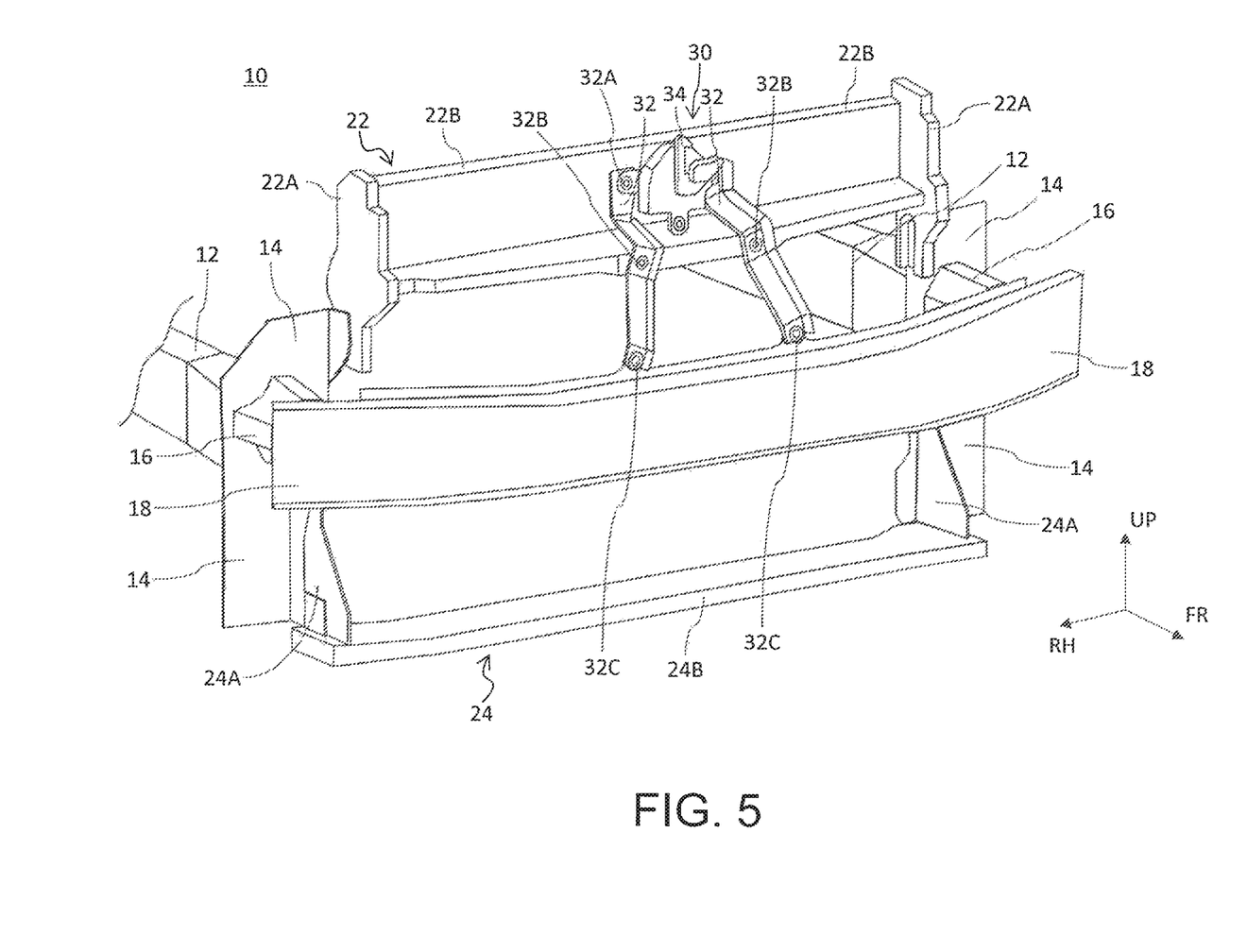
FIG. 5 is a perspective view illustrating a structure of a front body structure including a bracket coupling structure according to another example embodiment.
Figure 6:
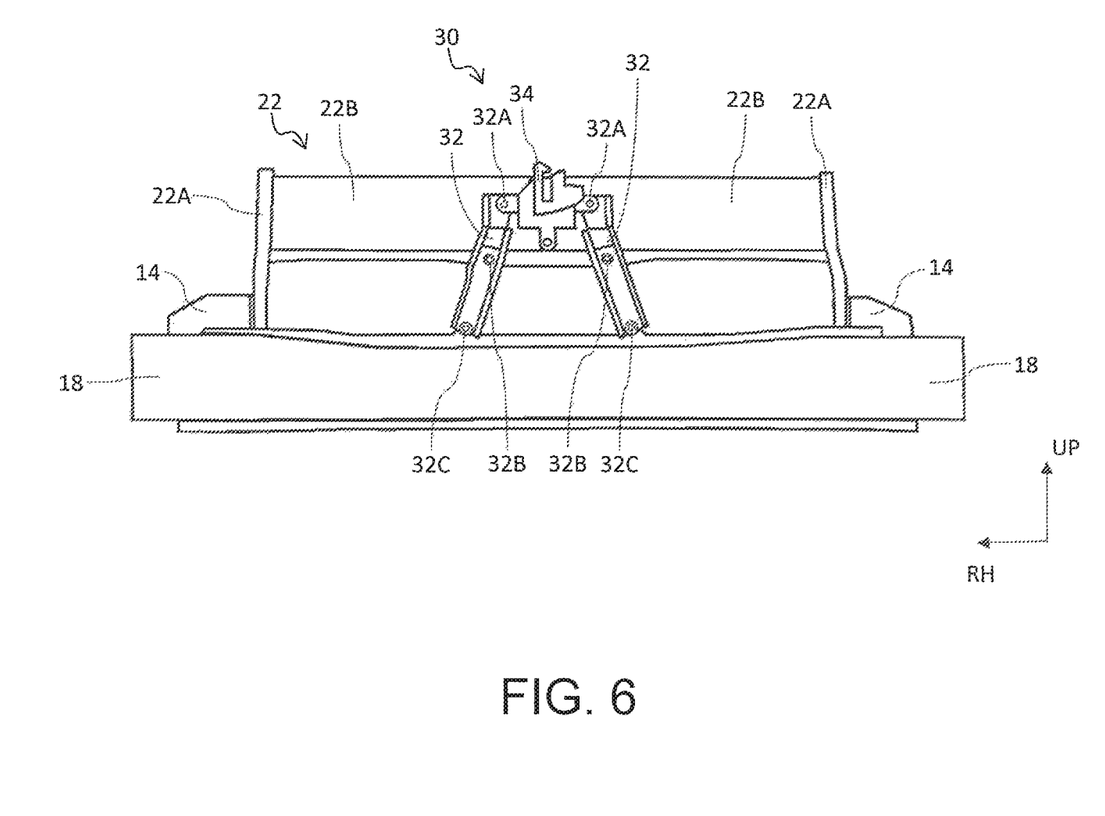
FIG. 6 is a front view schematically illustrating the bracket coupling structure according to the another example embodiment and the surrounding structure.

FIG. 5 and FIG. 6 illustrate a modified example of a bracket coupling structure 30 according to the present embodiment: FIG. 5 is a perspective view illustrating a front body structure 10 of a vehicle having the bracket coupling structure 30 according to the modified example; and FIG. 6 is a front view illustrating the bracket coupling structure 30, and its surrounding structure, according to the modified example. The bracket coupling structure 30 illustrated in FIG. 5 and FIG. 6 includes a pair of brackets 32 disposed symmetrically with respect to the center of the vehicle in the width direction, such that the distance between second fixing points 32B (the first interval) where the pair of brackets 32 are coupled with the upper part 22 is shorter than the distance between third fixing points 32C (the second interval) where the pair of brackets 32 are coupled with the bumper R/F 18, to form a truncated chevron shape in the front view. The bracket coupling structure having the above structure more appropriately disperses a load generated when a force in the vertical compression direction is applied to the hood lock.

It should be noted that the present invention is not limited to the embodiments described above and may include all such modifications and changes that do not depart from the technical scope or gist of the invention, as defined in the claims.

The invention claimed is:

1. A vehicle front structure comprising:
   a radiator support upper part disposed in a vehicle front portion and extending in a vehicle width direction, and supporting an upper portion of a radiator body;
   a bumper reinforcement extending in the vehicle width direction at a position more towards the front of the vehicle and lower than the radiator support upper part;
   a pair of brackets coupling the radiator support upper part and the bumper reinforcement; and
   a hood lock locking a striker attached to a front hood that covers a front upper portion of the vehicle,
   wherein both ends of the hood lock in the vehicle width direction are coupled to the pair of brackets and the radiator support upper part.

2. The vehicle front structure according to claim 1, wherein
   the hood lock is disposed at a center of the vehicle in the vehicle width direction, and
   the pair of brackets is disposed symmetrically with respect to the center of the vehicle in the width direction.

3. The vehicle front structure according to claim 1, wherein
   each of the pair of brackets has a crank shape.

4. The vehicle front structure according to claim 2, wherein
   each of the pair of brackets has a crank shape.

5. The vehicle front structure according to claim 1, wherein
   the radiator support upper part comprises resin, and both the bumper reinforcement and the pair of brackets comprise metal.

6. The vehicle front structure according to claim 2, wherein
   a first interval between first coupling positions at which the pair of brackets is respectively coupled with the radiator support upper part is shorter than a second interval between second coupling positions at which the pair of brackets are coupled with the bumper reinforcement.

\* \* \* \* \*